United States Patent [19]
Sibbett et al.

[11] Patent Number: 5,539,765
[45] Date of Patent: Jul. 23, 1996

[54] HIGH EFFICIENCY LASER

[75] Inventors: Wilson Sibbett; Bruce D. Sinclair, both of Fife; Neil MacKinnon, Ayrshire, all of Scotland

[73] Assignee: The University Court of the University of St. Andrews, Fife, Scotland

[21] Appl. No.: 516,016

[22] Filed: Aug. 16, 1995

Related U.S. Application Data

[63] Continuation of Ser. No. 329,433, Oct. 26, 1994, abandoned.

[30] Foreign Application Priority Data

Mar. 3, 1994 [GB] United Kingdom ............... 9404053

[51] Int. Cl.[6] ........................................... H01S 3/08
[52] U.S. Cl. ............................................ 372/92; 372/107
[58] Field of Search ........................... 372/92, 98, 99, 372/107, 21

[56] References Cited

U.S. PATENT DOCUMENTS

| | | | |
|---|---|---|---|
| 3,764,220 | 10/1973 | Billman et al. | 372/107 |
| 4,360,925 | 11/1982 | Brosnan et al. | 372/95 |
| 4,847,851 | 7/1989 | Dixon . | |
| 5,287,381 | 2/1994 | Hyuga et al. . | |
| 5,331,650 | 7/1994 | Maeda et al. . | |

FOREIGN PATENT DOCUMENTS 4291976 10/1992 Japan .

OTHER PUBLICATIONS

MacKinnon, N. and B. D. Sinclair, "A Laser Diode Array Pumped, Nd: $YVO_4$ /KTP, Composite Material Microchip Laser," Optics Communications, 105:183–187 No Month (1994).

MacKinnon, N. andB. D. Sinclair, "Pump Power Induced Cavity Stability in Lithium Neodymium Tetraphosphate (LNP) Microchip Lasers," Optics Communications 94:281–288 No Month (1992).

Nose, Y., Y. Kato, K. Yoshida and C. Yamanaka, "Dependence of Laser–Induced Damage Threshold of Anti–Reflection Coatings on Substrate Surface Roughness," Japanese J. of Applied Physics, 26:1256–1261 No Month (1987).

Wickham, M., M. Jensen, H. Injeyan, S. Ou, M. Sergant, J. Yang, F. Alvarez, C. Tu, P. Hayashida, R. Hilyard and L. Dozal, "Diode Pumped Nd: $YVO_4$ Microlaser 2D Array," Laboratory Notes, pp. 685–686, Nov., 1993.

*Primary Examiner*—Rodney B. Bovernick
*Assistant Examiner*—Robert E. Wise
*Attorney, Agent, or Firm*—Clifford W. Browning; Woodard, Emhardt, Naughton, Moriarty & McNett

[57] ABSTRACT

A laser 10 comprises a pump source 11, a resonator 13 including an etalon of gain material 15, and means 12 to focus the pump source 11 output onto one end 14 of the resonator 13 as a spot having a diameter in the range 50–150 μm. The resonator 13 includes substantially parallel end faces 14,19 having a relative taper better than 0.25 milliradians, and the end faces 14,19 are substantially free of scratches greater than 10 μm in size and pits greater than 5 μm in size. A thermally induced microlens 22 is formed at the surface 14 of the gain material 15.

15 Claims, 1 Drawing Sheet

HIGH EFFICIENCY LASER

This application is a continuation of application No. 08/329,433, filed Oct. 26, 1994, now abandoned.

BACKGROUND OF THE INVENTION

This invention relates to high efficiency lasers, and particularly to miniature lasers having a visible beam.

Lasers generally have a rather low efficiency, being the ratio of input energy to output energy; commercially available ruby lasers typically have an efficiency of less than 1%. Nevertheless, low efficiency is accepted because laser beams have a very high energy density.

Low efficiency is associated with several problems. Firstly the power source must be relatively large for a given energy output which can lead to rather bulky equipment having a large mass; such equipment is not suitable for use in portable or light weight applications, or in cases where small size is essential. Secondly a very large heat sink must be provided to remove waste heat for otherwise the laser may be damaged; such a heat sink further increases the bulk, mass and complication of laser devices, and in many cases comprises a water cooling arrangement having pipes, valves and the like which further restrict portability and flexibility of use. These problems also add to the cost of lasers and have hitherto restricted their application considerably.

Laser light has a generally normal distribution of frequencies, and within the frequency range a number of modes may be encountered. This is because there are usually several resonances between the reflector faces of the laser, each resonance being at a different frequency. It may be desirable to obtain a laser output at any one of these frequencies and thus anti-reflection and reflection coatings have been developed in order that only light at the desired frequency (the desired mode) is permitted to reflect between the laser end faces.

SUMMARY OF THE INVENTION

According to the present invention there is provided a laser comprising a pump source, a resonator including an etalon of gain material, and means to focus the pump source output onto one end face of said resonator as a spot, said resonator including substantially parallel end faces having a relative taper better than 0.25 milliradians, and said end faces being substantially free of scratches greater than 10 μm in size and pits greater than 5 μm in size. Optimum spot size is a function of the power density and the characteristics of the induced lens of a particular gain material; these parameters can be determined empirically and in preferred embodiments the size of the spot is in the range 50–150 μm.

The pump source causes localised heating and exitation of the gain material in the vicinity of the spot, said heating resulting in a thermally induced microlens at the surface of the gain material which defines and focuses the laser beam which results from stimulated emission above the laser threshold. In the preferred embodiment the induced lens constitutes a near spherical mirror.

In one embodiment the resonator consists of an etalon of gain material, preferably Nd:YVO$_4$ having an Nd concentration of 3% or more. The high concentration of Nd ensures localised stimulated emission of laser light and consequent localised heating of the gain material which in turn leads to an optically stronger thermally induced microlens. This optically strong lens defines and focuses the laser light to a small beam waist having high energy density.

In another embodiment the resonator comprises a composite etalon of gain material and non-linear material having a junction which is substantially optically perfect. Preferably the adjacent faces of the gain material and non-linear material are substantially parallel to the respective end face, the relative taper of a respective adjacent and end face being better than 0.25 milliradians, and the adjacent faces being substantially free of scratches greater than 10 μm in size and pits greater than 5 μm in size. Thus the end faces and the junction faces of the composite etalon are finished to substantially the same standard.

A surprising feature of this embodiment is that the laser light is highly stable and does not exhibit amplitude variation which might be expected in cases where more than one longitudinal mode exists at the fundamental frequency. In this latter case mode coupling in the non-linear material would usually result in amplitude variation, and special steps are often required to ensure a single longitudinal mode, for example by providing a ring laser having an unidirectional travelling wave beam.

The elimination of the resultant effect of mode coupling in this embodiment leads to a highly useful laser which is reliable in operation and economical to construct.

The junction faces may be in abutment, but such an arrangement requires very smooth and flat faces to obviate secondary cavities and Fresnel losses; secondary cavities may result in laser light being reflected from the junction face, and consequent undesirable noise and interference with laser light reflected from the output face of the non-linear material.

The preferred embodiment includes an index matching fluid between the gain material and non-linear material. Preferably the index matching fluid holds the gain material and non-linear material together by surface tension effects. The index matching fluid may be placed as a drop between the adjacent face which are then squeezed together to reduce the thickness of fluid to a molecular level. Preferably the index matching fluid has a refractive index which is between the respective refractive indices of the gain material and non-linear material. A further advantage of the index matching fluid is that it acts to reduce parasitic reflections from the junction faces of the composite resonator.

In a preferred embodiment the gain material is Nd:YVO$_4$ having an Nd concentration of 3%, the non-linear material is KTP, and the index matching fluid is a halo carbon oil having a refractive index n=1.41; this combination had little light loss at the junction of the gain material (n=2.2) and non-linear material (n=1.75) notwithstanding that the refractive index of the halo carbon oil was not in the preferred range.

As an alternative to direct abutment, or to the use of an index matching fluid, the junction faces of the gain material and non-linear material may be separated by a gap, each of the junction faces having a conventional anti-reflective coating at the appropriate laser wavelengths.

Such an arrangement has the advantage that a change in the gap can be used to control the band width of the laser light, and the threshold for stimulated emission, according to the established formula which defines the Free Spectral Range (FSR)=

$$\frac{1}{2nD}$$

where n is the refractive index of the gap and D is the gap size in the direction of the laser beam.

The junction faces may alternatively have no anti-reflective coating, the uncoated end faces defining a frequency selective intra cavity etalon.

In yet another embodiment, the composite resonator may have a substantially optically perfect junction between the gain material and the non-linear material, and an output face having an anti-reflective coating at the laser wavelength, a partially reflective mirror being provided at a distance from the output face and parallel to the plane thereof to act as an output reflector of the resonator.

Such an arrangement permits the band width of the laser light to be controlled by changing the gap between the end face of the composite resonator and the partially reflective mirror.

The gap may be an air gap (refractive index=1) or may be comprised of some other material having a refractive index which is useful in a particular application. The laser may include means to vary the gap mechanically.

The preferred composite etalon can provide green laser light with a wavelength of 532 nm. Such a laser is useful not only because it is visible but also because one use of the invention is in miniature lasers for surgery. Human tissue absorbs laser light at 532 nm, and some operations, for example in eye surgery, require highly portable lasers for photo coagulation of wounds. Existing lasers are bulky and heavy and often require a red laser tracer because the main laser beam is not in the visible spectrum; furthermore red lasers are difficult to see against the predominantly red background of an open body.

Preferably the resonator is symmetrical to reduce distortion due to thermal effects. The resonator is optimally circular in the plane perpendicular to the direction of laser light, but this arrangement has the disadvantage that the crystal direction must be marked, and a circular section resonator is difficult to mount on the necessary carrier.

In the preferred embodiment the composite etalon is approximately 3 mm×3 mm in section, the gain material having a thickness of 0.5 mm and the non-linear material having a thickness of 2 mm.

In the preferred embodiment the pump source comprises a laser diode having an output of approximately 650 mW though other pump sources may be focused to provide a spot of the required size. Thermal fracture of the laser may occur at high power inputs, and it is desirable that the resonator be physically small to reduce temperature related distortion effects to a minimum.

The laser diode may be mounted directly to the etalon of gain material at a spacing to ensure a spot of the required size.

In a preferred embodiment the laser diode source, and composite resonator are mounted on a base having control means to maintain the base at a desired operating temperature. Preferably the control means comprises a thermoelectric cooler comprising a plurality of thermo couples having a hot side and a cold side dependent on the direction of current flow. Such a device can be used to both heat and cool the laser and may include a feed back circuit to maintain the desired temperature notwithstanding changes in ambient temperature. The device may also provide a desired temperature gradient across the base where the optimum operating temperature for e.g. the laser source and non-linear material are different.

In the case of Nd:YVO$_4$ material it has been observed that a relatively weak mode exists at 913 nm. With an appropriate frequency doubling crystal the frequency of emitted laser light would be 457 nm which is blue and thus easily seen. More importantly an efficient blue laser would be highly useful in optical disc storage mechanisms because the frequency of the laser light determines the density with which information can be stored on an optical disc; the shorter the wavelength the smaller the size of the spot to which the laser light may be focused.

Therefore, in another embodiment, the end faces include end coatings which are highly transmissive to laser light at 1064 nm and 1340 nm but highly reflecting to laser light at 913 nm. In general the coatings must reflect little light at 1064 nm and 1340 nm since the mode at 913 nm is weak and any reflection at the higher wavelengths will reduce the gain at the 913 nm transition.

Preferably the reflection at 913 nm should be better than 99.8% whereas the reflection at the higher wavelengths should be less than 60% and preferably less than 5%.

This embodiment also comprises a composite resonator consisting of an etalon of Nd:YVO$_4$ gain material and a frequency doubling crystal, the resonator end faces being highly reflecting at 913 nm and highly transmissive at 1064 nm and 1340 nm, and the frequency doubling crystal being selected to double the frequency of laser light at 913 nm, and the resonator end faces being highly transmissive at 457 nm.

Typical materials suitable for the frequency doubling crystal of such a resonator are potassium niobate (KNbO$_3$) angle cut so as to achieve type 1 phase matched second harmonic generation. Other suitable materials are lithium iodate (LiIO$_3$), and cerium doped KTP.

Cooling of the gain material reduces the re-absorption of light at 913 nm and this increases laser efficiency. In one embodiment of the invention a composite resonator includes a frequency doubling crystal which is cooled at the output side thereof so as to induce heat to flow away from the gain material. In this embodiment the angle of cut of the frequency doubling material may require alteration to suit the temperature characteristics of the resonator since the phase matching between the fundamental and second harmonic is temperature dependent.

BRIEF DESCRIPTION OF THE DRAWINGS

Other features of the invention will be apparent from the following description of a preferred embodiment illustrated by way of example only in the accompanying drawings in which.

DESCRIPTION OF THE PREFERRED EMBODIMENTS

Figure 1:
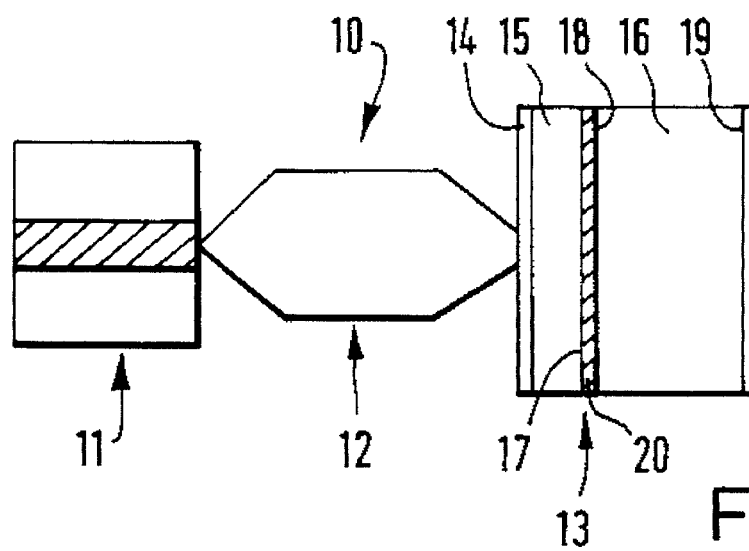
FIG. 1 is a schematic elevation of a laser according to the present invention.

With reference to the drawings there is illustrated a laser 10 comprising a pump source 11, an optical coupler 12 and a composite resonator 13. The laser is not drawn to scale, and certain features have been enlarged in order to improve clarity.

The pump source 11 comprises a conventional AlGaAs laser diode pump source having a maximum power output of approximately 650 mW at a wavelength of 809 nm. The wavelength is chosen to suit the gain material as will be further described below. The dimensions of the active area of a suitable diode are in the range 50–100 µm×1 µm, but active areas of up to 200 µm×1 µm are useful.

Laser diodes typically have a rather divergent output beam, and the pump source 11 is consequently connected to the resonator 13 by an optical coupler 12 of any suitable kind. The optical coupler ensures that the output of the source 11 is focused on the input face 14 of the resonator 13 as a spot having an approximate diameter of 100 µm.

As an alternative to the use of the optical coupler 12, the pump source 11 could be mounted directly on the input face of the resonator and spaced therefrom by a distance chosen to ensure that the divergence of the output beam of the source 11 resulted in a spot on the input face of the resonator having an approximate diameter of 100 µm.

The resonator 13 comprises a crystal 15 of $Nd:YVO_4$ gain material coupled to a crystal 16 of KTP non-linear material which acts as a frequency doubler and is described below in greater detail.

The gain material is a commercially available grade doped with Neodymium (Nd) to an active ion concentration of 3%.

The crystal of the gain material is approximately 3 mm square and has parallel end faces polished in a conventional manner to a thickness of 0.5 mm. The relative taper of the end faces is better than 0.25 milliradians, and the end faces are substantially free of scratches greater than 10 µm in size and pits greater than 5 µm in size.

The crystal of the KTP non-linear material is angle cut for type II phase matching of radiation having a wavelength of 1064 nm propagating at normal incidence to the crystal surfaces. The KTP crystal is subsequently polished to a thickness of 2 mm with substantially the same parallelism and surface finish as the $Nd:YVO_4$ crystal 15.

The input face 14 of crystal 15 is given a coating which is highly reflective (>99.7%) at the fundamental frequency of the gain material (1064 nm); this coating acts as one reflective surface of the resonator. The input face 14 is also given a coating which is anti-reflective (highly transmitting) at both the pump output wavelength (809 nm) and the second harmonic of the fundamental resonator frequency (532 nm). The output face 17 of the crystal 15 is uncoated.

The input face 18 of the KTP crystal is uncoated whereas the output face 19 is given a coating which highly reflective at the fundamental frequency of the gain material (1064 nm), thus constituting the second reflective surface of the resonator. The output face 19 is also given a coating which is anti-reflective at the second harmonic of the fundamental resonator frequency (532 nm), and at another resonating frequency of the gain material (1340 nm).

The preferred gain material has several excitation levels, and will typically produce spontaneous decay at 1064 and 1340 nm. If not controlled, stimulated emission at both of these wavelengths may occur when the appropriate threshold is reached. The threshold for stimulated 1340 nm emission is rather low because of the high gain of the $Nd:YVO_4$ material.

Spontaneous emission at 1340 nm is incoherent and is allowed to escape from the resonator to ensure that stimulated emission occurs only at 1064 nm. Parasitic oscillation at 1340 nm (by reflection from the output face) would both deplete the gain at 1064 nm and also cause undesirable amplitude variations in the resultant laser light at 532 nm.

Thus, the anti-reflective coatings at the output face 19 ensures unobstructed passage of both the coherent laser light at 532 nm and the incoherent light at 1340 nm, whilst reflecting laser light at the fundamental wavelength of 1064 nm.

The composite resonator is formed by bringing the respective uncoated surfaces together in correct alignment with a small drop of index matching fluid 20 therebetween. The $Nd:YVO_4$ crystal 15 and KTP crystal 16 are squeezed together and the index matching fluid spreads between the uncoated faces to give a very thin layer (c.0.1 µm) which bonds the faces against separation by surface tension effects.

The index matching fluid, which in the preferred embodiment is a halo-carbon oil having a refractive index N=1.41, eliminates cavities between the uncoated faces, and thus undesirable cavity resonances due to Fresnel reflections from the uncoated faces.

The use of an index matching fluid eliminates the requirement for anti-reflection coatings on the adjacent faces 17,18 which might otherwise be separated by a small air gap (leading to additional Fresnel losses), or be mechanically joined for direct optical contact. In these latter cases a reliable fabrication method would be required which would result in additional complexity and cost. Furthermore a construction having a small air gap requires a mechanical device to maintain the parts of the resonator in the correct spaced relationship. The high energy transfer within the resonator can lead to heat distortion of these parts with a resultant drop in resonator efficiency. An advantage of a construction using the index matching fluid is that only one of the component crystals need to be held thus eliminating mechanical strain within the assembly during operation thereof. Furthermore the oil layer permits a degree of compliance and flexibility, which further improves the stability and integrity of the resonator.

The composite resonator thus has very parallel end faces 14,19 which would apparently give only marginal stability to the resonating cavity, any non-axial beam tending to diverge from the central axis by an ever increasing angle until it leaves the cavity altogether.

Figure 2:
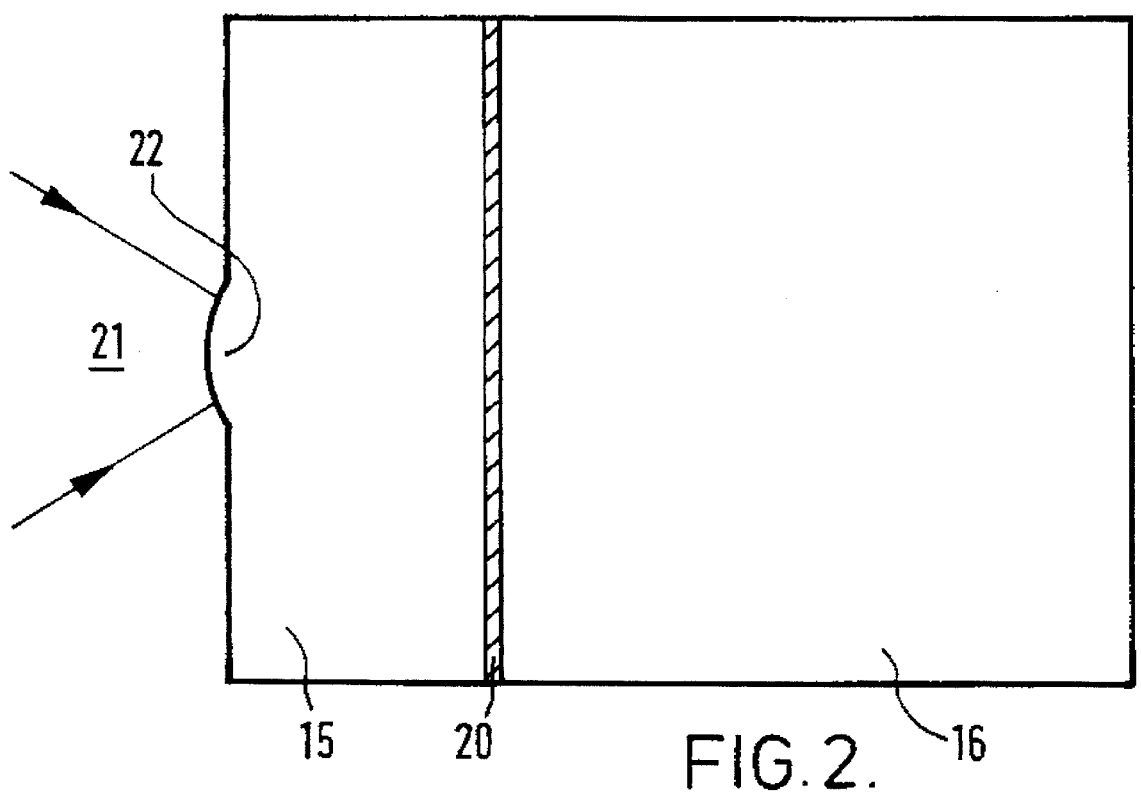
FIG. 2 is an enlarged sectional elevation showing a thermally induced lens.

In operation however the highly localised pump source heats the input face 14 to form a thermally induced lens at the outer surface thereof. FIG. 2 illustrates on an enlarged scale the energy beam 21, from the pump source 11, which impinges on the outer surface 14 of the crystal 15. The crystal material is heated and distorts to form a lens 22 which focuses a reciprocating beam close to the central axis of the resonator cavity.

Pump radiation is effective only in the relatively small volume of gain material close to the lens 22, but in this volume the energy of the 3% active ion concentration of Nd is raised and decays partially to a metastable level having a relatively long life of about 30–50 µs. (The wavelength of the pump source is 809 nm because this is a suitable absorbtion band for $Nd^{3+}$ ions). Stimulated emission can thus occur only in the vicinity of the lens 22 where Nd ions have a raised energy level.

Spontaneous decay of Nd ions to the ground state results in emission of energy waves having a wavelength of 1064 nm, and some of these waves are reflected from the output surface 19. Above a given threshold level, the spontaneous decay stimulates emission of further energy waves in a conventional laser manner, and the lens 22 focuses and reinforces the beam at each reflection. Reflection of the beam at the lens 22 causes a further minor heat loss which reinforces and stabilises the lens.

The thermally induced lens 22 has the effect of stabilising the laser cavity, and eliminates the need for a mechanically produced lens or other means of focusing the laser beam.

The beam produced as a result of the lens 22 has a small waist, thus ensuring excellent energy density.

The end faces of the laser cavity are nominally highly reflective at the fundamental laser frequency (1064 nm); a small amount of laser energy escapes past the reflective coating, and on the output side this beam-may be filtered out in a conventional manner.

The effect of the KTP material 16 is to convert laser energy at 1064 nm to energy at 532 nm. The conversion process is well understood and need not be further described in this specification save to mention that the optically powerful induced lens 22 results in a beam with high energy concentration and more efficient conversion in the KTP material.

Conversion of laser energy to the second harmonic is important because 532 nm is in the green visible band of light whereas radiation at 1064 nm cannot be seen. Furthermore laser light at 532 nm is more useful than conventional red laser light since the wavelength is smaller and thus the beam can be focused to a smaller point. This latter aspect is important in e.g. optical disk storage mechanisms where the density of stored material is dependent on the resolution of the laser beam. Light at 532 nm is emitted from the resonator end face 19 and may be focused as desired for any suitable end purpose. Reflected light at 532 nm also passes through the optical coating at the input face 14 because to permit such light to reflect could result an adverse effect on the frequency conversion in the KTP crystal.

Maximum power output at the second harmonic (532 nm) is around 130 mW which, for an incident pump source of 650 mW, indicates an overall optical efficiency of 20%. The consequence of improved efficiency is a substantial reduction in the level of waste heat and thus smaller power sources may be used for a given output whilst reducing or eliminating the need for a heat sink. The laser may be smaller, less expensive and have substantially less mass than a conventional laser of similar power output.

We claim:

1. A laser comprising a pump source, a resonator including an etalon of gain material, and means to focus the pump source output onto one end face of said resonator as a spot, said resonator including substantially parallel end faces having a relative taper better than 0.25 milliradians, and said end faces being substantially free of scratches greater than 10 μm in size and pits greater than 5 μm in size a thermally induced microlens being formed in use at the surface of the gain material.

2. The laser of claim 1 wherein said microlens comprises a substantially spherical mirror.

3. The laser of claim 1 wherein the etalon comprises a composite etalon of gain material and non-linear material having a junction which is substantially optically perfect.

4. The laser of claim 3 wherein the adjacent faces of the gain material and non-linear material are substantially parallel to the respective end face, the relative taper of a respective adjacent and end face being better than 0.25 milliradians, and the adjacent faces being substantially free of scratches greater than 10 μm in size and pits greater than 5 μm in size.

5. The laser of claim 3 wherein an index matching fluid is provided between the gain material and non-linear material.

6. The laser of claim 5 wherein the index matching material has a refractive index in the range defined by the respective refractive indices of the gain material and the non-linear material.

7. The laser of claim 5 and further including a base for the resonator, the base being attached to one only of the gain material and the non-linear material.

8. The laser of claim 3 wherein the gain material and non-linear material is spaced apart to define said junction, each of the junction faces having an anti-reflective coating at the desired laser wavelengths.

9. The laser of claim 1 wherein the gain material is Nd:YVO$_4$ having an Nd concentration of 3% or more.

10. The laser of claim 9 wherein the end faces thereof include coatings which are highly transmissive to laser light at 1064 nm and 1340 nm but highly reflective to laser light at 913 nm.

11. The laser of claim 10 wherein the reflectivity at 913 nm is greater than 99.8% and the reflectivity at higher wavelengths is less than 60%.

12. The laser of claim 11 wherein the reflectivity at higher wavelengths is less than 5%.

13. The laser of claim 9 wherein the end faces thereof include coatings which are highly transmissive to laser light at 1340 nm but highly reflective to laser light at 1064 nm.

14. The laser of claim 13 wherein the reflectivity at 1064 nm is greater than 99.7%.

15. The laser of claim 1 wherein said spot has a diameter in the range 50–150 μm.

* * * * *